Patented May 26, 1931

1,807,017

UNITED STATES PATENT OFFICE

ROWLAND D. SMITH, OF CORNING, NEW YORK, ASSIGNOR TO CORNING GLASS WORKS, OF CORNING, NEW YORK, A CORPORATION OF NEW YORK

TREATING GLASS ARTICLES

No Drawing. Application filed March 5, 1929, Serial No. 344,592. Renewed April 6, 1931.

This invention relates to treating glass articles and more particularly to preventing of loss of strength of inside frosted articles such as lamp bulbs.

It is well known that the surface of certain glasses which has been frosted is subject to "weathering" which causes a mechanical weakening when the article is subjected to rapid heating.

It is a matter of common knowledge that when lamp bulbs prior to being fabricated into lamps are stored for indefinite periods so that both their inner and outer surfaces are exposed to "weathering" and they are subjected to the rapid heating incident to lamp manufacture, they become mechanically weakened. This condition becomes serious when inside frosted bulbs are used as a slight external blow on the bulb is very likely to cause it to break.

The object of the present invention is to prevent mechanical weakening of glass articles which is caused by "weathering".

I have discovered that by using certain salts in the water in which the bulbs are washed after frosting that different results may be obtained; for instance, calcium or lime salts are very detrimental to the strength of the articles whereas aluminum salts in the wash water have been found to maintain the strength of the articles. Moreover, I have discovered that the injurious effects of certain salts naturally present in the wash water may be completely overcome by the addition of other salts, and I not only am able to neutralize the undesirable effects of the natural salt, but can so control the composition as to produce a beneficial effect.

My invention embodies the introduction into the wash water in which glass articles are to be washed of a sufficient quantity of aluminum salts to cause the articles to retain their strength so that they may be stored for indefinite periods without serious weakening when they are subsequently subjected to rapid heating.

In carrying my invention into practice, I introduce into the wash water; for instance, one which contains in terms of oxides ten (10) parts per million of lime, two (2) parts per million of magnesia, and six (6) parts per million of sulphuric anhydride; one hundred (100) parts per million of aluminum fluoride. By doing this I not only overcome the detrimental effects of the lime and magnesium salts initially present in the wash water, but eliminate the ill effects of weathering such as above described.

While from the foregoing it may seem that I am merely offsetting the detrimental effects of the lime and magnesium salts, I have found that pure distilled water to which no aluminum fluoride has been added will not produce as good results as the water above referred to, treated as set forth.

On the other hand, I still further can improve the resistance of glass articles to such mechanical weakening by using pure distilled water to which there has been added about two hundred (200) parts per million of aluminum fluoride.

While in the above I refer to aluminum fluoride, I have found that aulminum sulphate will, under the proper conditions and circumstances, serve equally well as the fluoride. I therefore do not wish to have my invention restricted to the use of the fluoride but wish to have the term fluoride, as used herein, interpreted to include the sulphate as well; nor do I wish to be limited as to the quantities of the aluminum salts set forth in the foregoing examples as these quantities added to the water may be varied up to seven hundred fifty (750) parts per million in accordance with the chemical composition of the water used.

I claim:

1. The method of treating glass articles which includes washing them in water containing simple aluminum fluoride.

2. The method of treating glass articles which includes washing them in water containing not more than seven hundred fifty parts per million of simple aluminum fluoride.

ROWLAND D. SMITH.